Patented May 2, 1939

2,156,266

UNITED STATES PATENT OFFICE 2,156,266

PROCESS FOR OBTAINING OXIDATION PRODUCTS FROM HYDROCARBONS

Eger V. Murphree and Edward D. Reeves, Baton Rouge, La., assignors to Standard Oil Development Company, a corporation of Delaware No Drawing. Application November 10, 1933, Serial No. 697,476

8 Claims. (Cl. 260—451)

The present invention relates to improvements in the method of producing valuable oxidation products from hydrocarbon waxes and more specifically to an improved method of producing such valuable partial oxidation products from waxes of high molecular weight. The method will be fully understood from the following description and from the results described.

There have been many proposals for partial oxidation of hydrocarbon materials to produce acids, aldehydes, ketones and alcohols, and hydrocarbon waxes have been oxidized in this manner. Relatively good quality products can be obtained from paraffin wax, and by this term it is meant the waxes of good crystal structure derived from the lower boiling petroleum distillates, but has been otherwise with the waxes of poor crystal structure, the slop waxes, or petrolatum waxes, which are of higher molecular weight than the paraffin wax and which while they may be obtained from distillate oils, are ordinarily derived from residuals. It is desirable to subject waxes of the latter type to partial oxidation in order to obtain products of higher molecular weight than can be obtained by the oxidation of paraffin waxes and to utilize a raw material which is cheaper and available in greater quantities. However, on oxidation of such materials, which is accomplished only with difficulty, as ordinarily produced, a poor grade of product results; dark, tarry and exceedingly difficult to purify.

The present invention comprises a method of oxidizing waxes of poor crystal structure and includes steps of purification and oxidation which are capable of producing an excellent grade of oxidation products which may be readily purified by economical means. By varying the method of treatment, products of different molecular weights may be obtained; for example, the average molecular weights of products may vary from about 100 to 400 or more.

The first step of the present invention consists in freeing the petrolatum or slop wax of excessive quantities of oil and this is done by extracting the oil with solvents of the type in which oil is freely soluble, but in which wax is not. There are many such solvents; for example, the low boiling hydrocarbons, such as ethane, propane and butane, or the corresponding olefins or mixtures of such hydrocarbons or even higher boiling hydrocarbons of the type of naphtha, but in the case of the latter it is particularly desirable to add nonsolvents for wax, such as alcohols, ketones, acids and esters. Among the alcohols, methyl, ethyl, isopropyl, secondary butyl, n-butyl or the amyl alcohols are useful. Acetone, dimethyl or diethyl ketone or methyl-ethyl-ketone may be used, and among the esters, the acetates and formates and the like are suitable. These solvents may be mixed in various proportions to produce relatively dry waxes from petrolatum and slop waxes. Other types of solvents, such as the chlorinated hydrocarbons, may be used for this purpose. Ethylene dichloride is particularly well adapted for this purpose.

The second step in our process, which may be omitted if desired, consists in the distillation of the wax which has been obtained in a substantially oil free state. This distillation may be of the simple type unaccompanied by decomposition or it may include a simultaneous decomposition and its primary purpose is to separate the bulk of the wax from 3 to 5% of less volatile materials which are almost invariably present and which for obscure reasons hinders the smooth process of oxidation. If simple distillation is employed, it is often desirable to include a subsequent decomposition step such as cracking or dehydrogenation, in order to produce an olefinic product for subsequent oxidation.

The distillation step is preferably carried out at temperatures from 600° F., at which substantially no decomposition occurs, to 900° F. or thereabout where vigorous destruction set in. Regulation of the pressure at which the distillation is accomplished presents a convenient method for adjusting the degree of decomposition; for example, if the pressure be about 200–400 mm. of mercury (absolute), the oxidation products will correspond quite closely to those produced by the oxidation of paraffin wax. At atmospheric pressure, the distillate is liquid and gives a large yield of oxidation products of molecular weight ranging from about 200–225. If the pressure be sufficiently reduced, say to 20–50 mm. of mercury, substantially no decomposition results and a large yield of products of high average molecular weights, say 300–400, are obtained by oxidation.

It will be understood that the cracking or dehydrogenation is not necessary to my process, but it is desirable to regulate the molecular weight of wax distillate. Cracking may be accomplished by passage through a hot tube at a temperature about 850 or 900° F. or higher and the velocity should be sufficient to prevent secondary reactions leading to formation of tarry impurities. Dehydrogenation may be conducted under substantially the same conditions, but catalysts are preferably used; for example, the oxides and/or sulphides of metals of the sixth group alone or admixed with oxides, hydroxides or carbonates of the metals of the third and fourth groups which form difficultly reducible oxides. Of these, alumina and thoria are most suitable. By the use of such catalysts, it is possible to obtain marked unsaturation without substantial rupture to carbon bonds and on subsequent oxidation large yields of very high molecular weight of oxidation products results. Dehydrogenation is ordinarily carried out at atmospheric pressure on the slightly elevated pressures up to, say, 10 atmospheres and hydrogen or other gases may be present, but at higher pressures hydrogen is omitted.

The oxidation itself is preferably conducted in the liquid phase at relatively low temperatures below 400° F. and preferably from 250 to 340° F. with air or other gas rich in free oxygen which is blown through the fluid. The oxidation may be conducted succesfully in aluminum lined vessels and in the presence of catalysts such as a small amount of previously oxidized wax or metallic salts of heavy acids; for example, manganese, cobalt, aluminum stearates or oleates, resinates or salts of acids of the type produced by the oxidation of wax. The oxidation may be conducted in batch for a period of about two to three hours or, preferably, until the saponifiable matter content of the product is from 20 to 70 percent, but it is desirable to go no further. The method may be made continuous by passing fresh material at intervals or continuously into the oxidation zone and withdrawing the product.

The product is purified by known means such as saponification, distillation and extraction with various solvents in order to separate the oxidation products from the unoxidized wax which may be returned for retreatment.

As an example of the operation of the present process, the following may be considered:

Petrolatum having a melting point of 148° F. is mixed with five times its volume of ethylene dichloride at a temperature of 160° F. On chilling to about 70° F., wax is precipitated and this is removed by filtration from the mixture of oil and solvent. The wax cake is then washed with pure solvent and is substantially free from liquid oily products. The wax yield is 30% and it is found to have a melting point of 167° F.

A portion of the wax obtained in the manner described above is distilled at a temperature of 780° F. while at a pressure of 40 mm. of mercury (absolute). The distillate comprising about 90% of the wax is blown with air at a temperature of about 300° F. The oxidation product is brown in color, has an acid number of 32 and a saponification number of 104.

A second sample of the wax is distilled under pressure of 200 mm. of mercury, and on oxidation as described above, a yellow-brown product with an acid number of 33 and a saponification number of 119 is recovered.

A third sample, distilled at normal atmospheric pressure, yields a product with an acid number of 38.5 and a saponification figure of 154. This product is dark brown.

The present method is not to be limited by any particular means for removing the oil from the wax nor to any method of distillation or by process for converting the wax to an olefinic product, nor indeed to any specific method of oxidation, but only to the following claims in which we wish to claim all knowledge inherent of the invention.

We claim:

1. An improved process for producing partial oxidation products from high molecular weight waxes of the type obtained from petrolatum comprising extraction the petrolatum with a solvent to remove oily constituents therefrom and produce a dry wax substantially free from liquid oil and subjecting the dry wax to oxidation in the liquid phase with a gas containing free oxygen.

2. An improved process for producing partial oxidation products from petrolatum comprising removing substantially all of the liquid oils therefrom, distilling the wax so produced and then subjecting the wax distillate to oxidation in the liquid phase with air at a temperature from about 250 to 340° F.

3. Process according to claim 2 in which oxidation is continued for a time sufficient to produce a product containing from 20 to 70 percent of saponifiable matter, and partial oxidation products are then separated from the wax hydrocarbons.

4. Process according to claim 2 in which the distilled wax is subjected to thermal decomposition prior to oxidation.

5. Process according to claim 2 in which pressure during distillation is adjusted to obtain simultaneous decomposition.

6. An improved process for producing partial oxidation products from high molecular weight waxes of the type obtained from petrolatum which comprises extracting liquid oily materials from the solid waxy constituents with a solvent to remove the oil therefrom and produce a dry wax substantially free from liquid oil and then subjecting the dry wax to partial oxidation in the liquid phase with free oxygen.

7. A new product derived by the treatment in liquid phase with a gas rich in free oxygen of a dry hydrocarbon wax dried by selective solvent treatment in the presence of a non-solvent for wax, the oxidized dry hydrocarbon wax characterized by the fact that it has a molecular weight of from 225 to 400, an acid number of at least 32, and a saponification number of at least 104.

8. An improved process for producing partial oxidation products from high molecular weight waxes of the type obtained from petrolatum, comprising subjecting said petrolatum to selective-solvent treatment in the presence of a non-solvent for wax, to remove the oily constituents from said petrolatum and produce a dry wax substantially free from liquid oil, and subjecting the dry wax to oxidation in the liquid phase with a gas containing free oxygen.

EGER V. MURPHREE.
EDWARD D. REEVES.